US008438029B1

(12) United States Patent
Stuttle et al.

(10) Patent No.: US 8,438,029 B1
(45) Date of Patent: May 7, 2013

(54) CONFIDENCE TYING FOR UNSUPERVISED SYNTHETIC SPEECH ADAPTATION

(75) Inventors: Matthew Nicholas Stuttle, Sussex (GB); Byungha Chun, Surrey (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/592,047

(22) Filed: Aug. 22, 2012

(51) Int. Cl.
*G10L 15/06* (2006.01)

(52) U.S. Cl.
USPC ........... 704/245; 704/220; 704/235; 704/246; 704/251; 704/252

(58) Field of Classification Search .................. 704/220, 704/235, 245–247, 251, 252, 258
See application file for complete search history.

(56) References Cited

U.S. PATENT DOCUMENTS

| | | | | |
|---|---|---|---|---|
| 7,617,105 | B2 | 11/2009 | Shi et al. | |
| 7,684,988 | B2 * | 3/2010 | Barquilla | 704/256.1 |
| 7,689,421 | B2 | 3/2010 | Li et al. | |
| 2002/0013707 | A1 * | 1/2002 | Shaw et al. | 704/257 |
| 2005/0033574 | A1 * | 2/2005 | Kim et al. | 704/251 |
| 2005/0071157 | A1 * | 3/2005 | Droppo et al. | 704/226 |
| 2007/0233490 | A1 | 10/2007 | Yao | |
| 2008/0221877 | A1 * | 9/2008 | Sumita | 704/211 |
| 2008/0319753 | A1 | 12/2008 | Hancock | |
| 2011/0313762 | A1 * | 12/2011 | Ben-David et al. | 704/231 |

OTHER PUBLICATIONS emime.org, "Welcome to the EMIME Project", May 9, 2012.

Foote, J.T., "Decision-Tree Probability Modeling for HMM Speech Recognition", May 1994, Ph.D. Thesis, Division of Engineering, Brown University, Providence, RI.

Kaszczuk, M. et al, "Evaluating Ivona Speech Synthesis System for Blizzard Challenge 2006", Sep. 16, 2006, Proceedings of Blizzard Challenge 2006 Workshop, Pittsburgh, PA.

Kaszczuk, M. et al., "The IVO Software Blizzard 2007 Entry: Improving Ivona Speech Synthesis System", Aug. 25, 2007, Proceedings of Blizzard Challenge 2007 Workshop, Bonn, Germany.

Macherey, K et al., "Multi-Level Error Handling for Tree Based Dialogue Course Management", Sep. 2003, Proceedings of the European Conference on Speech Communication and Technology, vol. 1, pp. 601-604, Geneva, Switzerland.

Shinoda, K., "Speaker Adaptation Techniques for Automatic Speech Recognition", Proceedings of APSIPA ASC 2011, Oct. 18, 2011, X'ian, China.

(Continued)

*Primary Examiner* — Leonard Saint Cyr
(74) *Attorney, Agent, or Firm* — McDonnell Boehnen Hulbert & Berghoff LLP

(57) ABSTRACT

Disclosed are apparatus and methods for generating synthesized utterances. A computing device can receive speech data corresponding to spoken utterances of a particular speaker. Textual elements of an input text corresponding to the speech data can be recognized. Confidence levels associated with the recognized textual elements can be determined. Speech-synthesis parameters of decision trees can be adapted based on the speech data, recognized textual elements, and associated confidence levels. Each adapted decision tree can map individual elements of a text to individual of the speech-synthesis parameters. A second input text can be received. The second input text can be mapped to speech-synthesis parameters using the adapted decision trees. A synthesized spoken utterance can be generated corresponding to the second input text using the speech-synthesis parameters. At least some of the speech-synthesis parameters are configured to simulate the particular speaker.

17 Claims, 9 Drawing Sheets

OTHER PUBLICATIONS

Tokuda, K., "An HMM-Based Approach to Flexible Speech Synthesis", Dec. 13-16, 2006, Speech Slides, 5th International Symposium on Chinese Spoken Language Processing, Kent Ridge, Singapore.
Woodland, P.C., "Speaker Adaptation for Continuous Density HMMs: A Review", Aug. 29-30, 2001, Proceedings of the ITRW on Adaptation Methods for Speech Recognition, International Speech Communication Association (ISCA), Sophia Antipolis, France.
Yamagishi, J. et al., "Analysis of Speaker Adaptation Algorithms for HMM-Based Speech Synthesis and a Constrained SMAPLR Adaptation Algorithm", IEEE Transactions on Audio, Speech, and Language Processing, Jan. 2009, pp. 66-83, vol. 17, No. 1, IEEE.
Yamagishi, J. et al., "New and Emerging Applications of Speech Synthesis", Feb. 9, 2011, Speech Slides, University of Edinburgh, Edinburgh, UK.
Young, S. J. et al., "Tree-Based State Tying for High Accuracy Acoustic Modeling", Proceedings of the APRA Human Language Technology Workshop, Mar. 1994, pp. 307-312, Plainsboro, NJ.

* cited by examiner

Node N1 330
Context Label 332
Words in sentence = 3
Word position in sentence = 1
Phoneme = th
Syllables in word = 1
Syllable position in word = 1
Phoneme to right = “A”
Phoneme to left = N/A
Consonant? = YES
Phoneme type = is_fricative
Vowel to right = YES
Confidence 334: 0.1

CONFIDENCE TYING FOR UNSUPERVISED SYNTHETIC SPEECH ADAPTATION

BACKGROUND

Unless otherwise indicated herein, the materials described in this section are not prior art to the claims in this application and are not admitted to be prior art by inclusion in this section.

There has been interest shown in "adaptation" or building synthetic voices from spontaneous or "found" speech, such as voicemails or audio-video clips. To build a synthetic voice, the audio is typically transcribed to text. The easiest transcription method is to use automatic speech recognition [ASR] algorithms on the spontaneous/found speech to generate the text. However, ASR can be error-prone, leading to a large number of transcription errors in the output text, with a subsequent degradation in the quality of the synthetic voice.

Training for speech recognition and generation of synthetic voices can use a "source" database of spoken speech, which in some cases, can involve a large amount (e.g., 50+ hours) of spoken speech. During training, a Hidden Markov Model (HMM) can be generated to model the database of spoken speech, and decision trees can be generated based on the HMM.

For example, suppose the input sentence to the HMM were "Butter wouldn't melt." Then, the complete or "full context" for the first phoneme, or basic element of speech in this sentence, can include features such as:

phoneme id: /b/
consonant/vowel: consonant
plosive (stop consonant)
position of word in sentence: 1
words in sentence: 3
syllable position in word: 1
syllables in word: 2
phoneme to the right: /u/
phoneme to the left: N/A
vowel to the right: yes
type of vowel to right: mid-back
. . . .

Each feature can be modeled as the answer to a yes/no question in a decision tree, with a most significant feature for distinguishing data at a top node of the tree and progressively less significant features in nodes below the top node. At the top of the tree, errors in input text have little or no import, as there is little or no classification of text-related features, while at the leaf node level, text errors have greater import. That is, top-level questions often have little or no relation to the input text, such as "Is this the start of a sentence?" or "Is the input sound a consonant?" At the leaf nodes, the questions are detailed so to identify specific acoustic features.

As a full context can be very detailed and many contexts can be generated for a corpus of input speech, linguistic features or "contexts" of the HMM can be "clustered", or grouped together to form the decision trees. Clustering can simplify the decision trees by finding the distinctions that readily group the input speech. In some cases, a "tied" or "clustered" decision tree can be generated that does not distinguish all features that make up full contexts for all phonemes; rather, a clustered decision tree stops when most important features in the contexts can be identified.

A group of decision trees, perhaps including clustered decision trees, can form a "source acoustic model" or "speaker-independent acoustic model" that uses likelihoods of the training data in the source database of spoken speech to cluster and split the spoken speech data based on features in the contexts of the spoken speech. As shown in FIG. 1A, each stream of information (fundamental frequency (F0), duration, spectral, and aperiodicity) can have a separately trained decision tree in the source acoustic model. FIG. 1B shows the top four layers of an example spectral decision tree.

In current adaptation systems, audible words or "speech data" from a designated speaker can be transcribed to generate "input text." The speech data can be broken down into frames of small amounts, e.g., 10 to 50 milliseconds of speech. During adaptation, each frame of the speech data and/or the input text can be applied at any level of the tree to propagate down to the physical models at the leaf (bottom) nodes.

FIG. 1C shows an example of prior art adaptation of source acoustic model 100, where speech data 110 and input text 120 generated by ASR are propagated down decision trees DT1, DT2, DT3, . . . DTn, n>0, of source acoustic model 100. As an example, for adaptation of the acoustic model of FIG. 1A, n=4, with DT1 corresponding to the Aperiodicity DT, DT2 corresponding to the Spectral DT, DT3 corresponding to the Duration DT, and DT4 corresponding to the F0 DT.

The decision trees DT1, DT2, DT3, . . . DTn can be generated based on an HMM constructed during a training session utilizing part or all of the speech in the database of spoken speech. FIG. 1C also shows that frames of speech data 110 can be provided to an automatic speech recognition (ASR) unit to determine input text for the speech data. In a typical adaptation system, each feature tree is only traversed to a fixed depth, such as two or four nodes deep, to avoid errors in classification of features and/or errors in the input text. Source acoustic model 100 can then be said to be adapted by a prior system when all decision trees DT1, DT2, DT3, . . . DTn, have been traversed to their respective fixed depths.

SUMMARY

In one aspect, a method is provided. A computing device receives speech data corresponding to one or more spoken utterances of a particular speaker. Textual elements of a first input text corresponding to the speech data are recognized. Confidence levels associated with the recognized textual elements are determined. Speech-synthesis parameters of one or more decision trees are adapted based on the speech data, recognized textual elements, and associated confidence levels. Each decision tree is configured to map individual elements of a text to individual of the speech-synthesis parameters. A second input text is received. The second input text is mapped to a set of speech-synthesis parameters using the one or more adapted decision trees. A synthesized spoken utterance corresponding to the second input text is generated using the set of speech-synthesis parameters. At least some of the speech-synthesis parameters in the set of speech-synthesis parameters are configured to simulate the particular speaker.

In another aspect, a computing device is provided. The computing device includes a processor and a computer-readable storage medium having instructions stored thereon that, in response to execution by the processor, cause the computing device to perform functions. The functions include: (a) receiving speech data corresponding to one or more spoken utterances of a particular speaker, (b) recognizing textual elements of a first input text corresponding to the speech data, (c) determining confidence levels associated with the recognized textual elements, (d) adapting speech-synthesis parameters of one or more decision trees based on the speech data, recognized textual elements, and associated confidence levels, where each adapted decision tree is configured to map individual elements of a text to individual of the speech-synthesis parameters, (e) receiving a second input text, (f)

mapping the second input text to a set of speech-synthesis parameters using the one or more adapted decision trees, and (g) generating a synthesized spoken utterance corresponding to the second input text using the set of speech-synthesis parameters, where at least some of the speech-synthesis parameters in the set of speech-synthesis parameters are configured to simulate the particular speaker.

In another aspect, an article of manufacture is provided. The article of manufacture includes a computer-readable storage medium having instructions stored thereon that, when executed by a processor, cause the processor to perform functions. The functions include: (a) receiving speech data corresponding to one or more spoken utterances of a particular speaker, (b) recognizing textual elements of a first input text corresponding to the speech data, (c) determining confidence levels associated with the recognized textual elements, (d) adapting speech-synthesis parameters of one or more decision trees based on the speech data, recognized textual elements, and associated confidence levels, where each adapted decision tree is configured to map individual elements of a text to individual of the speech-synthesis parameters, (e) receiving a second input text, (f) mapping the second input text to a set of speech-synthesis parameters using the one or more adapted decision trees, and (g) generating a synthesized spoken utterance corresponding to the second input text using the set of speech-synthesis parameters, where at least some of the speech-synthesis parameters in the set of speech-synthesis parameters are configured to simulate the particular speaker.

DETAILED DESCRIPTION

Overview

Figure 1A:
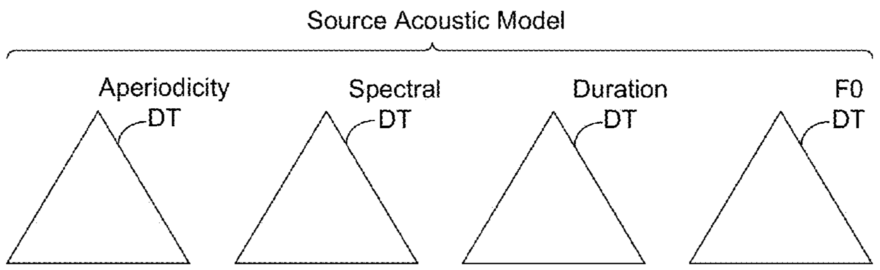
FIG. 1A (Prior Art)
FIG. 1A shows a prior art trained acoustic model.
Figure 1B:
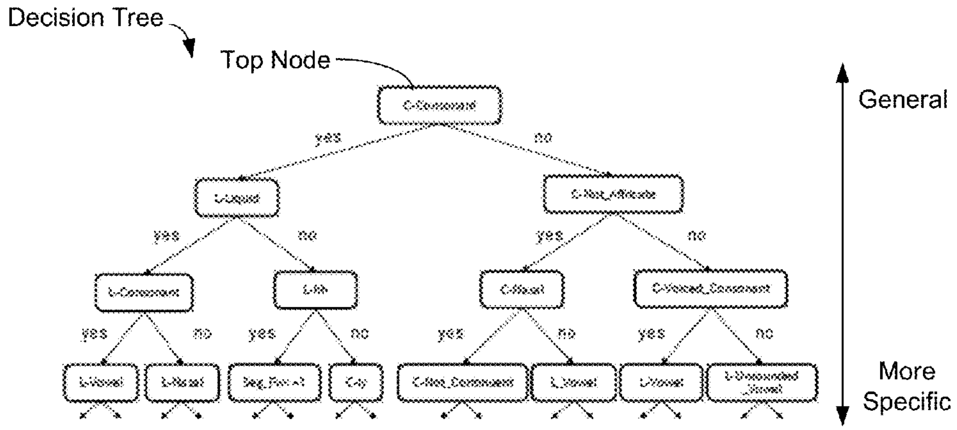
FIG. 1B (Prior Art)
FIG. 1B shows a prior art spectral decision tree.

Disclosed herein are techniques for using automatic speech recognition (ASR) confidences from many different levels in training or adapting an acoustic model based on speech data. Statistical synthetic voices (e.g., a Hidden Markov Model [HMM]) are trained or adapted on transcribed voice data. Training is the process of building a voice from scratch, whereas adaptation uses a smaller set of data to build in or adapt at least some of the parameters of source speaker(s). Acoustic models typically work on a sub-word (phonemic) level. The linguistic feature set for a given language is exhaustively large, as it is based on a combination of phonetic identity, class and context, position of model in syllable, position of syllable in word, identity of word etc. A physical occurrence of a phoneme can be specified by these features but only a tiny fraction will ever be observed (particularly in the case of adaptation where only a few minutes of speech from a particular speaker might be used). Source acoustic model decision tree(s) DT1, DT2, DT3, . . . DTn, n>0, can be generated by training using speech from source speaker(s).

As part of a process of adapting source decision trees DT1, DT2, DT3, . . . DTn, n>0, to a designated speaker, speech data can be propagated down the decision trees from the top nodes toward leaf nodes. As speech data are propagated down the decision trees, more specific questions are asked, leading to a better-sounding adapted voice. At one extreme, only a single transform is trained for the designated speaker at the top of the tree. At the other extreme, sufficient data exists to train and adapt each leaf node, a.k.a. a node at the bottom of the tree, to the designated speaker.

As the amount, quality, and content of speech available can vary from designated speaker to designated speaker, the "depth" or amount of propagation down a decision tree during adaptation can vary from designated speaker to designated speaker. Therefore, during the adaptation process, the frames of speech captured from the designated speaker and probability and text data from the ASR process are provided to traverse the decision trees. Once all of the speech, text, and probability data have been provided to traverse the decision trees, the depth of traversal for each decision tree will vary, in general.

After the decision trees have been traversed as far as possible using the speech of the designated speaker, the source decision trees can then be adapted. In some scenarios, adapting a decision tree can include pushing speech-synthesis parameter values "units", or frames of speech from the designated speaker and/or chosen from a node $N_{depth}$ at the depth of traversal down to the leaf nodes of the decision tree. In some embodiments, full adaptation of decision trees can be performed using a recursive a-posteriori-based traversal algorithm, such as the Constrained Structural Maximum a Posteriori Linear Regression (CSMAPLR) algorithm.

In other scenarios, adapting the decision tree can include "clustering" the decision tree at the node $N_{depth}$ at a maximum depth of traversal. In this context, clustering involves using the speech-synthesis parameter values at the $N_{depth}$ node for all nodes that descend from the $N_{depth}$ node. In some embodiments, clustering can involve removing some or all nodes from the decision tree that descend from the node $N_{depth}$.

To generate speech for a second input text, the second input text is received and used to traverse the fully adapted decision trees to reach leaf and/or clustered nodes of the decision trees. The units can be output as speech, while speech-synthesis parameter values at the root nodes and the second input text can be provided to a text output routine to read the second input text using a voice with vocal characteristics based on the speech-synthesis parameter values.

Figure 2:
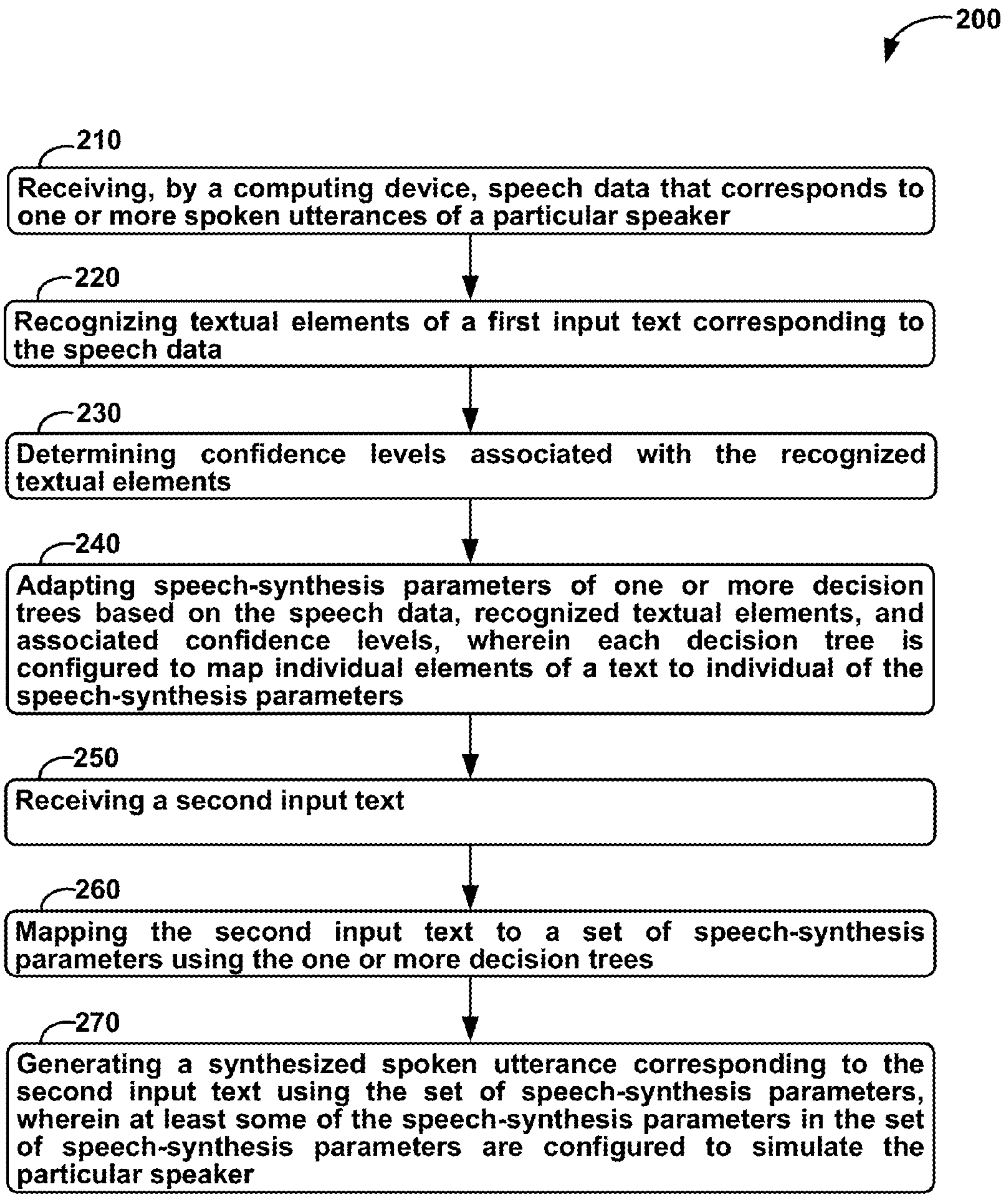
FIG. 2 is a flow chart of a method, in accordance with an example embodiment.

These techniques can improve adapted speech quality by taking advantage of both speech data from designated speaker(s) and probability data generated by ASR processes while processing the speech data from the designated speaker(s). This use of probability data may lead to better Example Operations Returning to the Figures, FIG. 2 is a flow chart of method 200, in accordance with an example embodiment. Method 200 begins at block 210, where speech data that corresponds to one or more spoken utterances of a particular speaker can be received at a computing device.

At block 220, the computing device can recognize textual elements of a first input text corresponding to the speech data.

At block 230, the computing device can determine confidence levels associated with the recognized textual elements. In some embodiments, at least one confidence level of the associated confidence levels can be associated with a phoneme identity, phonetic class identity, a word identity, a location of an element within a syllable, a location of an element within a word, and/or a location of an element within a sentence.

In other embodiments, each confidence level of the associated confidence levels can include a posterior probability.

At block 240, the computing device can adapt one or more decision trees based on the speech data, recognized textual elements, and associated confidence levels. Each adapted decision tree can be configured to map individual elements of a text to individual speech-synthesis parameters.

In some embodiments, adapting the one or more decision trees can include generating the one or more decision trees based on utilizing speech in a database of spoken speech.

In particular of these embodiments, adapting the one or more decision trees can include selecting a top node of the one or more decision trees, where the top node comprises one or more sub-nodes, and where each of the one or more sub-nodes is associated with a selected textual element of the first input text. A probability threshold can be determined. Then for each of the one or more sub-nodes: a probability that the selected textual element has the feature associated with the sub-node can be determined, where the probability based on the associated confidence levels, a determination can be made whether the probability that the selected textual element has the associated feature exceeds the probability threshold, and in response to a determination that the probability of the selected textual element having the associated feature exceeds the probability threshold, the sub-node can be selected. A determination can be made whether a selected sub-node of the one or more sub-nodes has been selected. Then, in response to a determination that a selected sub-node of the one or more sub-nodes has been selected: a determination can be made that the first input text has the associated feature, and the selected sub-node can be selected the top node.

In more particular embodiments, selecting the top node of the one or more decision trees can include selecting a root node of the one or more decision trees as the top node.

In still other embodiments, the one or more decision trees can include a decision tree for fundamental frequency (F0), a spectral decision tree, a decision tree for duration, and a decision tree for aperiodicity.

In even other embodiments, at least one of the speech-synthesis parameters for the top node can be utilized for adaptation. Utilizing the at least one of the speech-synthesis parameters for the top node for adaptation can include: modifying at least one of the speech-synthesis parameters for the top node based on the selected textual element, using the speech-synthesis parameter values at the top node for all nodes that descend from the top node, and/or pushing the speech-synthesis parameter values at the top node down to all nodes that descend from the top node. Other adaptations of speech-synthesis parameters of the top-node are possible as well.

In still even other embodiments, at least one of the speech-synthesis parameters for the selected sub-node can be adapted. Utilizing the at least one of the speech-synthesis parameters for the selected sub-node for adaptation can include: modifying at least one of the speech-synthesis parameters for the selected sub-node based on the selected textual element, using the speech-synthesis parameter values at the selected sub-node for all nodes that descend from the selected sub-node, and/or pushing the speech-synthesis parameter values at the selected sub-node down to all nodes that descend from the selected sub-node. Other adaptations of speech-synthesis parameters of the selected sub-node are possible as well.

At block 250, the computing device can receive a second input text.

At block 260, the computing device can map the second input text to a set of speech-synthesis parameters using the one or more decision trees.

At block 270, the computing device can generate a synthesized spoken utterance corresponding to the second input text using the set of speech-synthesis parameters. At least some of the speech-synthesis parameters in the set of speech-synthesis parameters are configured to simulate the particular speaker.

Example Construction of Acoustic Models for Adaptation

Figures 3A, 3B:
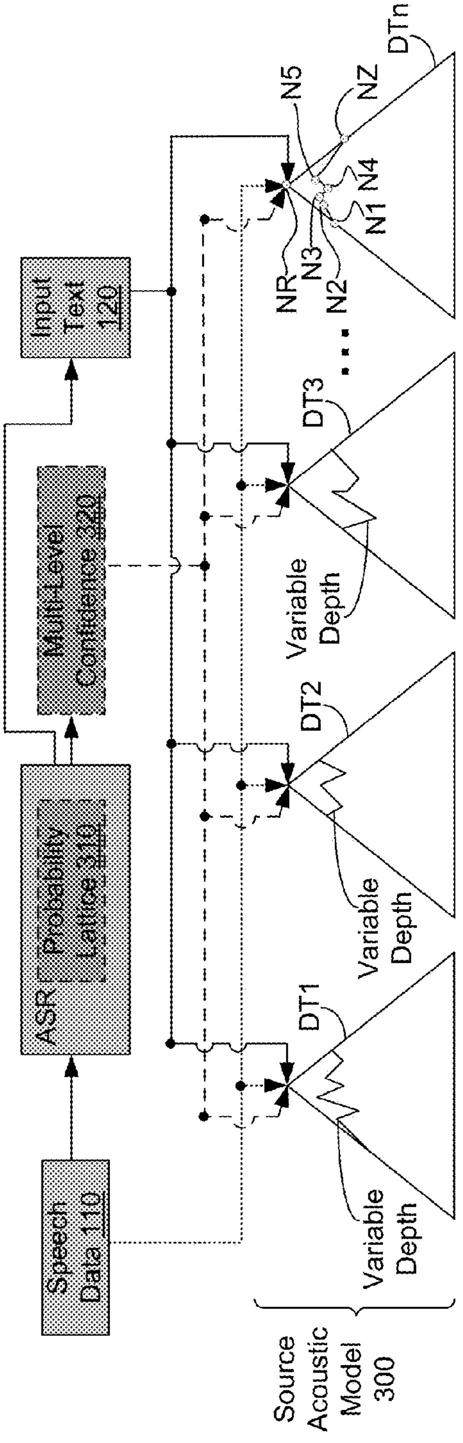
FIG. 3A shows an example process of adapting a trained acoustic model utilizing three inputs: speech data, input text and a multi-level confidence generated from a probability lattice of the Automatic Speech Recognition (ASR) process, in accordance with an example embodiment.
FIG. 3B shows an example node, in accordance with an example embodiment.

FIG. 3A shows an example process of adapting source acoustic model 300 utilizing three inputs: speech data 110, input text 120 and multi-level confidence 320 generated from probability lattice 310 of the ASR process. Adaptation can involve a process of using speech data from a designated speaker to complete a pre-determined speech model so that the completed speech model can be used to simulate the designated speaker's voice. Speech data 110 can be from the designated speaker.

While performing ASR on speech data 110, the transcribed input text 120 can be accompanied by confidences in the transcription. The confidences can be expressed as probability lattice 310, or collection of probabilities, at the word or phonemic level. The ASR system can generate a probability lattice for each frame of the speech input.

For example, suppose the designated speaker provided speech input of "They want what we have." An example probability lattice for this speech input is shown in Table 1 below:

TABLE 1

| | |
|---|---|
| HE (0.5) | \| WANT (0.8) \| WHAT (0.8) \| WEAVE (0.2) |
| THE (0.3) | \| . . . |
| TREE (0.2) | \| . . . |
| THEY (0.1) | |

The top row of the probability lattice shows the most likely words, with the probabilities shown in parenthesis. In this example, the input text generated by the ASR would be the list of most likely words, which equals "He want what weave." The ASR has assigned a probability of 0.5 to the word "He", "want" and "what" each have a respective 0.8 probability, and "weave" has a probability of 0.2. The probabilities in the probability lattice are "posterior" probabilities, or probabilities determined based after taking relevant evidence—the speech input—into account.

FIG. 3B shows an example node 330 corresponding to node N1 in FIG. 3A, in accordance with an example embodiment. Node 330 has a context label 332 with speech-synthesis parameters, such as phonetic information, about the node. For example, context label 332 can include a word position in a sentence, a phoneme for the node, a phoneme type, a "vowel to right" flag and other phonetic information. In some embodiments, more, less, and/or different information and/or speech-synthesis parameters can be included in the context label.

The word position in the sentence can indicate where a word is placed within a sentence associated with the node. In the example shown in FIG. 3B, context label 332 can represent the phoneme "Th" of the word "They" in the example sentence "They want what we have" discussed immediately above in the context of Table 1. The word "They" is the first word in the example sentence, so the word position is in context label 332 is "1". As another example, the word "want", which is the second word in the example sentence, the word position would be "2" and so on.

The phoneme of node 330 indicates which phoneme(s) are represented by node 330; as shown in FIG. 3B, the phoneme for node 330 is "th". A type of phoneme indicates whether a type of consonant or vowel associated with the phoneme, such as plosive, nasal, fricative, stop, etc. The "vowel to right" flag can be set to YES if a vowel is to the right of the phoneme in context label 332.

Node 330 also includes confidence value 334 for the node, which indicates how likely context label 332 is accurate. As indicated above, the confidence level can be based on one or more probabilities of a probability lattice generated by an ASR process. As the word "They" has a 0.1 probability in the probability lattice shown in Table 1 above, a confidence 334 that context label 332 is accurate is set to 0.1. Other confidence levels are possible as well.

For each question in a decision tree, it is possible to use confidence information from the probability lattice to push the information further down the decision tree. Suppose the first question in a decision tree of "Is the first character a consonant?" Then, observing the example probability lattice shown above, the choices for the first word are "He", "The", "Tree", and "They". All of the choices of the first word start with consonants, and the sum of the probabilities for these choices is 1.0, so the first question can be answered with "Yes" and with a probability of 1.0.

As another example, if the first question in the decision tree is: "Is this the last phoneme", there is often little likelihood of another phoneme occurring after the last phoneme, so the collected data can be passed down the relevant branch of the tree. However, if there is little confidence at the phonemic level, the information can stay at the current node and the adaption process may terminate. Word and syllable boundary probabilities can be inferred from the word posterior/confusion network or lattice output by the ASR system.

Multi-level confidence 320 shown in FIG. 3A can be determined based on probability lattices 310 to determine probabilities for various phonetic elements, such as but not limited to a phoneme probability, a phonetic-class-identity probability, a word probability, a phrase probability, and/or a sentence probability. In some embodiments, the probabilities can include probabilities for locations of a phonetic element, such as but not limited to a location of a phonetic element within a syllable, a location of a phonetic element within a word, and/or a location of a phonetic element within a word.

These probabilities can be posterior probabilities, or probabilities determined based on the text previously processed in generating the model chain, and can be stored in a lattice based on a current di-phone and a next di-phone. A di-phone is a set of phones, or sub-syllabic features, from a middle of a first phone to a middle of a second phone. For example, consider the word "strength." Strength has one syllable with three sub-syllabic features: an initial sub-syllabic feature "str", a vowel sound "eh", and a final sub-syllabic feature "ng-th". An example di-phone for "strength test" can be "eh-ng-th-T", where the "T" represents the initial sub-syllabic feature of the word "test". In some cases, a di-phone can be an adjacent pair of phones; for a definition of di-phone, "str-eh" would be the di-phone corresponding to the adjacent pair of the first and second phones of the word "strength."

If probability lattices 310 for the first ten input frames of speech assign a monotonically increasing probability that the first word is W, then multi-level confidence 320 can increase a probability for the first word being W, as well as increasing related probabilities, such as a probability that the first phone of the sentence is the first phone of W, a probability that the first di-phone of the sentence is the first di-phone of W, probabilities for first phrases starting with W (with related decreases for first phrases not starting with W), and probabilities for sentences starting with W.

Once multi-level confidence 320 for a given frame is determined, an adaptation process can start at the first node of the decision trees, and descend until termination. In some embodiments, the adaptation process can descend as long as a confidence in the answer exceeds a pre-determined probability threshold. For example, suppose the probability threshold is 0.9, then the adaptation process can descend the decision tree as long as the adaptation process can determine an answer to a question in the decision tree with a probability greater than or equal to 0.9. In other embodiments, a "soft decision" could select a branch of the decision tree based on the confidence probability (i.e., if a decision is 95% sure, 95% of the observations will go down the "sure" branch and 5% will go down the "alternative" or not sure branch).

In some embodiments, the confidence in the answer can be determined using a cumulative probability value. For example, a decision were made at a node N4 that was a child node of node N3, which was a child node of node N2, which was a child node of the top node N1, and that the probabilities at nodes N1, N2, N3, and N4 are, respectively, 1.0, 0.9, 0.9, and 0.8. One technique to determine a cumulative probability at a node is to multiply the probabilities, if any, from the parent nodes by the probability at the node. If the node does not have any parent nodes, the cumulative probability at the node equals the probability of the node. In this example, the cumulative probabilities for nodes N1, N2, N3, and N4 are, respectively, 1.0, 0.9, 0.81, and 0.648.

Traversal down the tree can continue until the cumulative probability drops below a pre-determined cumulative probability value; e.g., when the pre-determined cumulative probability value=0.85, then traversal of the tree can stop at node N3, while when the pre-determined cumulative probability value=0.7, then traversal of the tree can stop at node N4. Combinations of probabilities at nodes and cumulative probabilities can be used to make stopping decisions; e.g., traversal can continue until either (a) a probability at a node drops below a pre-determined minimum node probability value or (b) a pre-determined cumulative probability value drops below a pre-determined minimum cumulative probability. Other techniques for determining probabilities at a node and/or using probabilities to determine traversal decisions can be used as well.

Figure 1C:
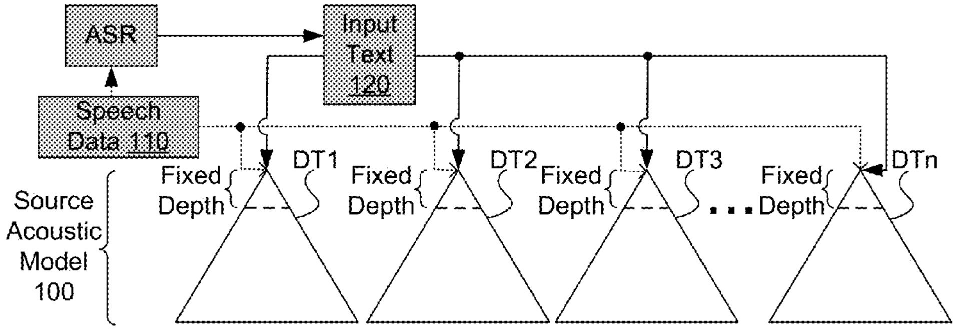
FIG. 1C (Prior Art)
FIG. 1C shows an example of prior art adaptation of a trained acoustic model.

FIG. 3A illustrates that, as the ASR system recognizes speech data 110 to generate input text 120, speech data 110, input text 120 and multi-level confidence 320 can be provided to source acoustic model 300 and its constituent decision trees DT1, DT2, DT3, . . . DTn. Source acoustic model 300 can be considered partially-adapted once all inputs have been processed to determine a variable depth level for each decision tree. The variable depth level shown in the decision trees for FIG. 3A contrasts to the fixed depth level used by the prior art system shown in FIG. 1C.

The variable depth level for a partially-adapted decision tree can be considered to include the nodes in the decision tree that were last reached while processing speech data 110 and input text 120 during the adaptation process. As shown in the example of decision tree DTn of FIG. 3, suppose that processing speech data 110 and input text 120 lead to reaching a node N1(8) eight levels below the root node NR of a decision tree DTn, a node N2(5) five levels below root node NR, a node N3(3) three levels below root node NR, a node N4(6) six levels below root node NR, and so on until reaching a node NZ(x) x levels below root node NR.

Let $\{N_{depth}\}$ be the collection of nodes at a maximum depth reached during the adaptation process; i.e., $\{N_{depth}\}$=the set of nodes at the variable depth level. The $\{N_{depth}\}$ nodes can be used as starting positions to complete the adaptation of the decision tree. Once the adaptation process is no longer able to continue descending down a decision tree; that is, once a partially-adapted acoustic model is generated, the decisions made by the adaptation process leading to the variable depth level can be used to complete adaptation of the trained acoustic model.

In some embodiments, adaptation of a partially-adapted acoustic model can be completed by propagating the decisions from $\{N_{depth}\}$ nodes down the partially-adapted decision trees using linear regression and/or by clustering parameter values of one or more of the $\{N_{depth}\}$ nodes. For example, the Constrained Structural Maximum A Posteriori Linear Regression (CSMAPLR) algorithm, which uses piecewise linear regression functions to estimate paths to the leaf nodes, can be used to propagate data down a partially-adapted decision tree.

To propagate data down the partially-adapted decision tree, global transforms W, X at the variable depth level can be estimated. To propagate down a decision tree from a current (reached) node to a child (unreached) node, the global transform can be re-estimated using a Maximum A Posteriori (MAP) criterion:

$$\hat{\Lambda} = (W, X) = \arg\max_{\Lambda} P(O \mid \lambda, \Lambda) P(\Lambda)$$

where P(Λ) is a prior distribution for transforms W and X, λ=an N-state Hidden Markov Model (HMM) used to generate the decision trees with an $i^{th}$ state output $b_i(O)$ and duration Gaussian distributions $p_i(d)$ characterized by mean vector $\mu_i$ and diagonal covariance matrix $\Sigma_i$. W and X are respective transforms of the outputs $b_i$ and $p_i(d)$.

For CSMAPLR, P(A) can be proportional to $|\Omega|^{-(L+1)/2}|\Psi|^{-L/2}|\tau_p|^{-1}|\psi|^{-1/2}$ times $\exp\{-0.5\mathrm{tr}(W-H)^T\Omega^{-1}(W-H)\ \Psi^{-1}\}$ times $\exp\{-0.5\mathrm{tr}(X-\eta)^T\ \tau_p^{-1}(X-\eta)\ \psi^{-1}\}$, where $\Omega \in \mathbb{R}^{L\times L}$, $\Psi \in \mathbb{R}^{(L+1)\times(L+1)}$, $H \in \mathbb{R}^{L\times(L+2)}$, $\tau_p>0$, $\psi \in \mathbb{R}^{2\times 2}$ and $\eta \in \mathbb{R}^{1\times 2}$ are hyper-parameters for prior distribution P( ). For CSMAPLR, Ψ and ψ can be fixed to identity matrices of suitable sizes and Ω can set to a scaled identity matrix; e.g., $\Omega = C \times I_L$, where C is a positive scalar, so Ω can be determined based on the positive scalar C.

W and X can then be re-estimated after going to a child node using techniques based on the Baum-Welch algorithm. The $1^{th}$ row vector of W, $w_1$, and X can be determined as follows:

$$w_i = (\alpha p_1 + y'_1) G'^{-1}_1 \text{ and}$$

$$X = (\beta q + z') K'^{-1}$$

where $p_1=[0, c_1]$, q=[0,1], and $c_1$ is the $1^{th}$ cofactor row vector of W.

$y'_1$, $G'_1$, z', and K' can be determined as:

$$y'_1 = y_{1+} C h_1, \text{ with } h_1 \text{ being the } 1^{th} \text{ row vector of } H,$$

$$G'_1 + C I_{L+1},$$

$$z' = z + \tau_p \eta, \text{ and}$$

$$K' = K + \tau_p I_2.$$

Then, $y_1$, $G_1$, z, and K can be determined as:

$$y_l = \sum_{r=1}^{R_b} \sum_{t=1}^{T} \sum_{d=1}^{t} \gamma_t^d(r) \frac{1}{\Sigma_r(l)} \mu_r(l) \sum_{s=t-d+1}^{t} \xi_S^T + C \cdot H(l)$$

$$G_l = \sum_{r=1}^{R_b} \sum_{t=1}^{T} \sum_{d=1}^{t} \gamma_t^d(r) \frac{1}{\Sigma_r(l)} \sum_{s=t-d+1}^{t} \xi_S \xi_S^T$$

$$z = \sum_{r=1}^{R_p} \sum_{t=1}^{T} \sum_{d=1}^{t} \gamma_t^d(r) \frac{1}{\sigma_r^2} d\, \phi_r^T$$

$$K = \sum_{r=1}^{R_p} \sum_{t=1}^{T} \sum_{d=1}^{t} \gamma_t^d(r) \frac{1}{\sigma_r^2} \phi_r \phi_r^T$$

with $\Sigma_r(1)$ being the $1^{th}$ diagonal element of the diagonal covariance matrix $\tau_r$ and with $\mu_r(1)$ begin the $1^{th}$ element of the observation vector $\mu_r$.

Then, α and β are scalar values that satisfy the following quadratic equations:

$$\alpha^2 p_l G_l^{-1} p_l^T + \alpha p_l G_l^{-1} y_l^T - \sum_{r=1}^{R_b} \sum_{t=1}^{T} \sum_{d=1}^{t} \gamma_t^d(r)\, d = 0$$

$$\beta^2 q K^{-1} q^T + \beta q K^{-1} z^T - \sum_{r=1}^{R_p} \sum_{t=1}^{T} \sum_{d=1}^{t} \gamma_t^d(r)\, d = 0$$

To propagate down the decision tree, a decision at the child node to take either the "Yes" or "No" branch can be made using the MAP criteria above and then the W and X transforms can be re-estimated using the equations above. If the child node has no further branches, then the child node is a leaf node and the propagation is complete for that child/leaf node.

Figure 4A:
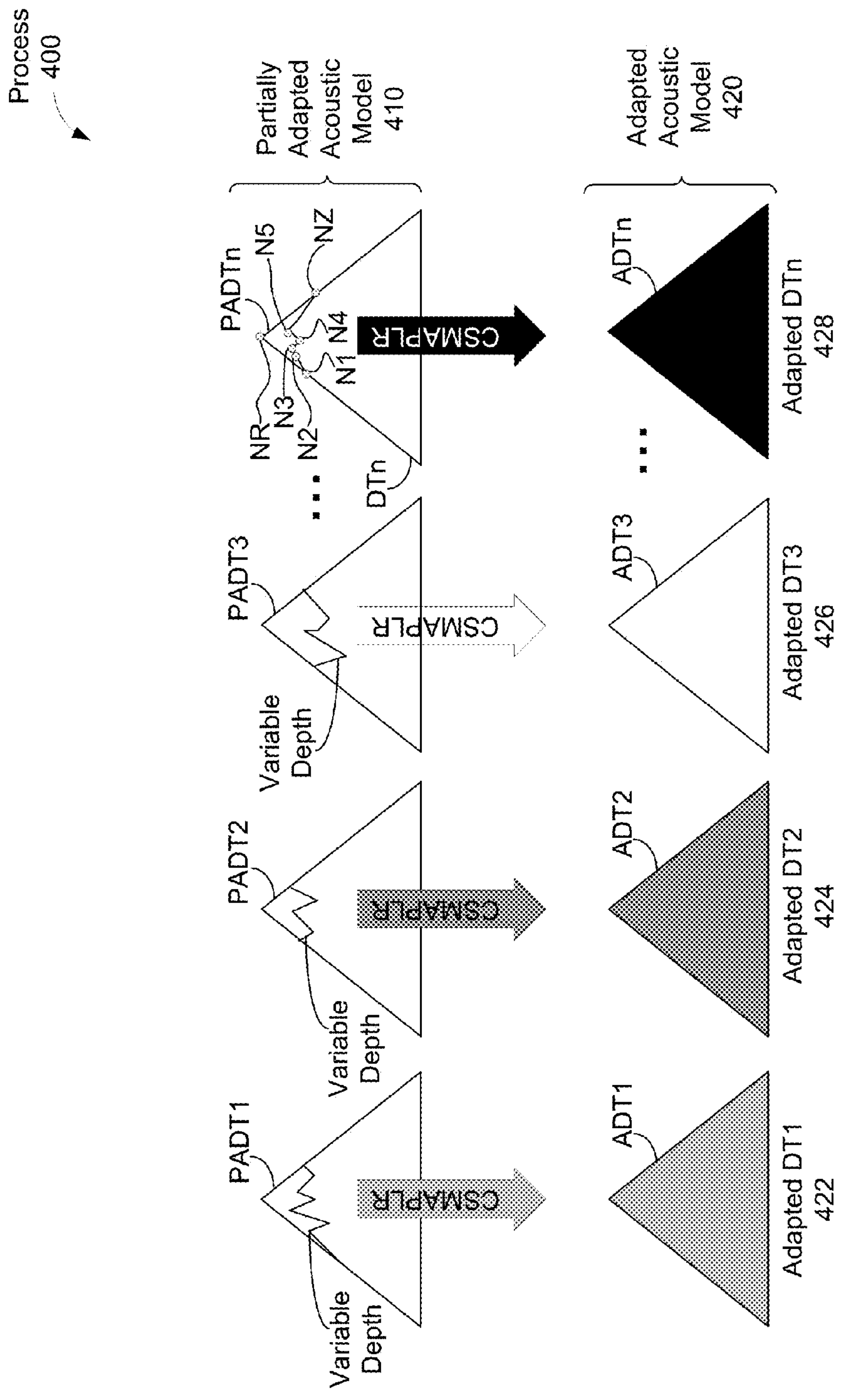
FIG. 4A shows an example process for completing adaptation of a partially-adapted acoustic model to generate an adapted acoustic model that does not use clustering, in accordance with an example embodiment.

FIG. 4A shows an example process 400 for completing adaptation of partially-adapted acoustic model 410 to generate adapted acoustic model 420 that does not use clustering. For each partially-adapted decision tree PADT1, PADT2, PADT3, . . . PADTn in partially-adapted acoustic model 410, a "push down algorithm", such as the CSMAPLR algorithm shown in FIG. 4, starts at the set of $\{N_{depth}\}$ nodes at the variable depth level for the partially-adapted decision tree. Then, the push down algorithm recursively applies an estimation technique, such as the maximum-a-posteriori (MAP) estimation technique of CSMAPLR, to move down the partially-adapted decision tree; that is, descend from the $\{N_{depth}\}$ nodes of the partially-adapted decision tree to ultimately reach the leaf nodes of the partially-adapted decision tree. After completion of the push down algorithm for all of the $\{N_{depth}\}$ nodes, adaptation of the partially-adapted decision tree is completed. After completion of adaptation for all of the partially-adapted decision trees, the resulting adapted acoustic model 420 can include adapted decision trees ADT1 422, ADT2 424, ADT3 426, . . . , and ADTn 428.

Note that while ADTs 422-428 are not clustered during adaptation process 400, one or more of ADTs 422-428 could have clustered nodes generated using data from a source database of spoken speech. These source-generated clustered nodes are discussed in more detail immediately below in the context of at least FIG. 4B.

Figure 4B:
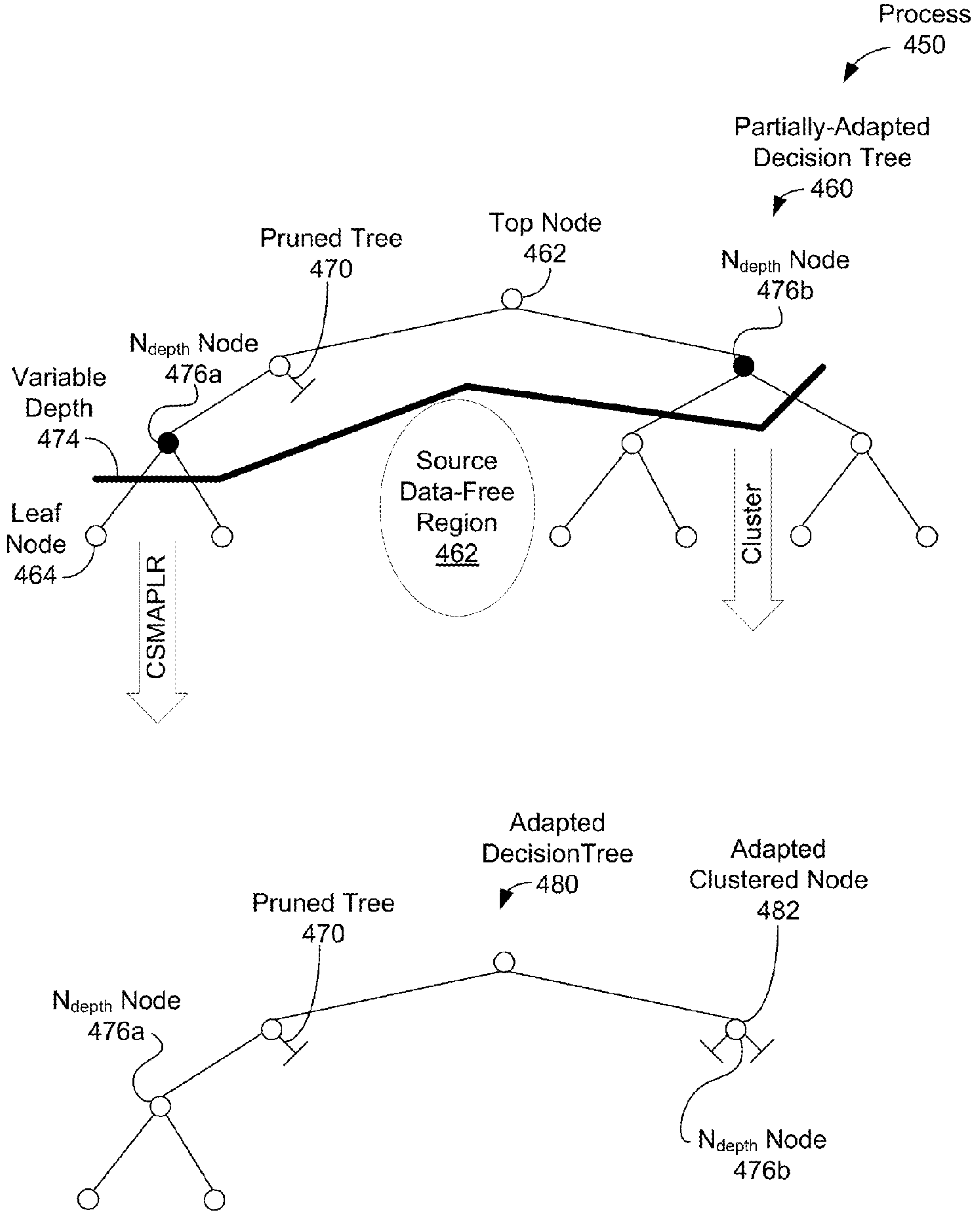
FIG. 4B shows an example adaptation process using both clustering and data propagation, in accordance with an example embodiment.

FIG. 4B shows adaptation process 450 that uses both clustering and data propagation, in accordance with an example embodiment. Process 450 is shown in FIG. 4B operating on partially-adapted decision tree 460 that starts at top node 462 and ends with several leaf nodes, such as leaf node 464. Prior to adaptation, decision tree 460 was generated using data from a source database of spoken speech. The source database of spoken speech did have data covering all of the questions that could be answered by decision tree 460. Rather, as shown in FIG. 4B, the source data included source data-free region 462 where little or no data was available to generate decision tree 460. As such, pruned tree 470 can be generated while creating decision tree 460 from the source database.

Process 450 starts with identifying the $\{N_{depth}\}$ nodes at a level of variable depth 474. $\{N_{depth}\}$ nodes 476*a* and 476*b*, shown in black in FIG. 4B, are nodes of partially-adapted decision tree 460 just above level of variable depth 474. The depth of a node N can be determined as a number of levels in a tree that node N is below the top node; e.g., the depth of top node 462 is 0. As other examples, FIG. 4B shows the depth of node 476*b* is 1, as the level including top node 462 is above node 476*b*, and the depth of node 476*a* is 2, as a first level including top node 462, and a second level including node 476*b* are above node 476*a*.

Then, for each node $N_i$ of the $\{N_{depth}\}$ nodes, process 450 determines whether parameter values will be propagated from $N_i$ or if parameter values will be clustered at $N_i$. One example technique to determine whether to use data propagation or clustering is to be used for $N_i$. is to make the determination based on the depth of node $N_i$, $D(N_i)$. In some embodiments, when $D(N_i)$ is greater than or equal to a threshold depth value $D_{thr}$, process 450 can use data propagation and use clustering when $D(N_i)$ is less than $D_{thr}$. In the example shown in FIG. 4B, $D_{thr}$ is set to 2. As D(Node 476*a*)=2, a data propagation technique, such as CSMAPLR, can be used to propagate speech-parameter values from node 476*a* down decision tree 460 to leaf nodes, such as leaf node 464. However, as D(Node 476*b*)=1, clustering can be performed at node 476*b*. Clustering can involve using the speech-parameter values from node 476*b* both for node 476*b* itself and for any node below node 476*b*. As the node(s) below node 476*b* are not to be examined after clustering, the nodes below node 476*b* can be deleted from decision tree 460 as part of process 450.

Process 450 leads to generation of adapted tree 480, where the node(s) below node 476*b* have been removed from adapted decision tree 480, and speech parameter values from adapted cluster node 482 can be used in lieu of speech parameter values from the removed nodes. Adapted decision tree 480 also includes nodes below node 476*b*, as speech parameter values from node 476*a* were propagated down to the nodes below, but the nodes themselves remain in adapted decision tree 480.

Figure 5A:
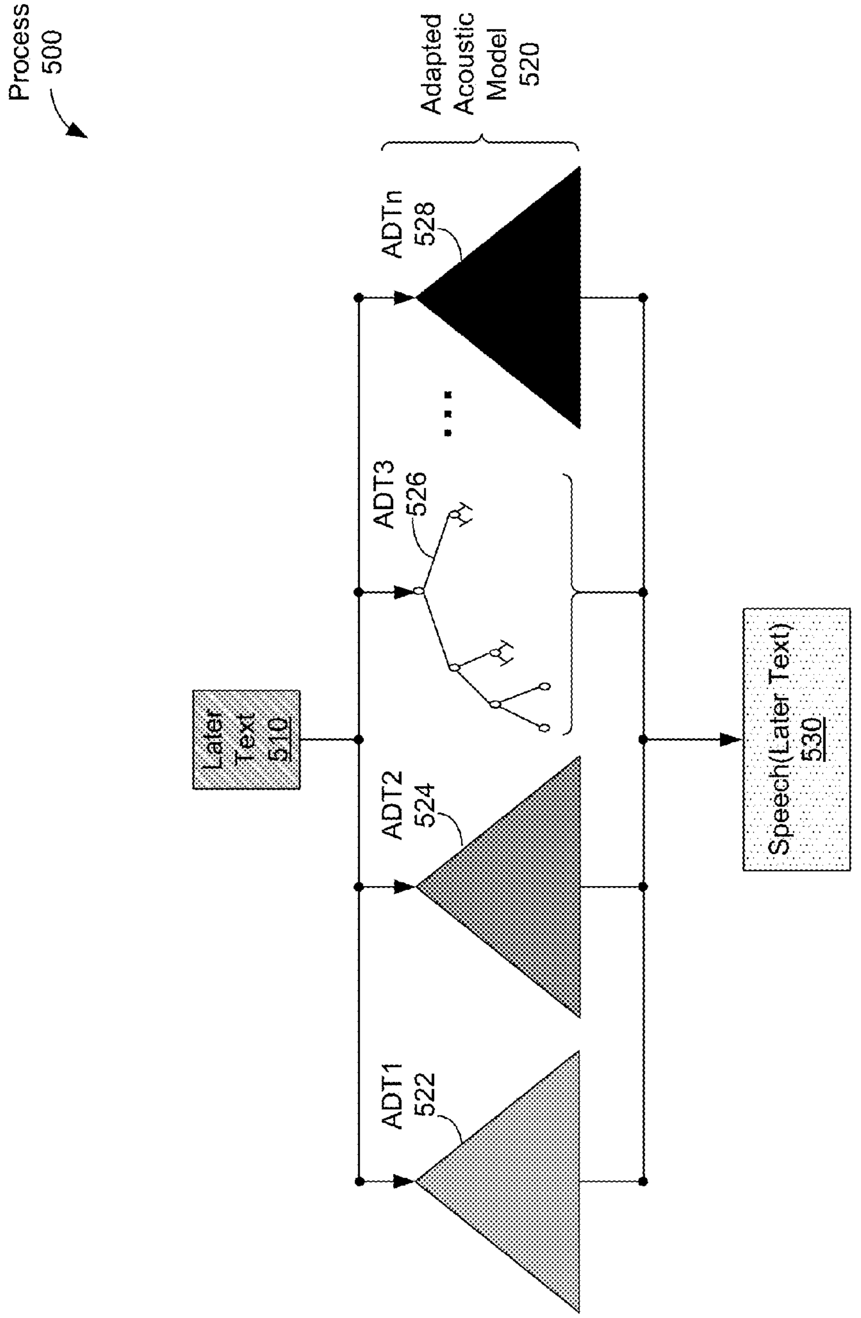
FIG. 5A shows an example process of generating speech corresponding to later input text using an adapted acoustic model, in accordance with an example embodiment.

FIG. 5A shows example process 500 of generating speech 530 corresponding to later input text 510 using adapted acoustic model 520 that includes adapted decision trees (ADTs) 522, 524, 526, 528, in accordance with an example embodiment. As shown in FIG. 5A, adapted acoustic model 520 includes decision trees, such as ADT3 526, with nodes that have been clustered, perhaps during adaptation, and decision trees without any clustered nodes, such as ADT1 522. In other examples, all decision trees in an adapted acoustic model can include clustered nodes, while in other examples, all decision trees in an adapted acoustic model can be without clustered nodes.

Process 500 starts with receiving a second input or "later" input text, shown in FIG. 5A as later text 510. Adapted acoustic model 520 can be used to generate speech 530 that includes a synthesized voice reading later text 510, where the synthesized voice simulates the designated speaker's voice modeled using adapted acoustic model 520.

Later text 510 may differ from the above-mentioned input text. For example, the speech data used to generate the input text can be one or more utterances captured from audio data, such as a voice mail or portion of a broadcast or movie, while later text 510 can be one or more e-mails, web pages, SMS messages, documents including text, other messages and/or documents containing text.

Later text 510 can be normalized and word identifiers can be generated from the normalized text. The word identifiers can be broken down into phones, or sub-syllabic features, and di-phones generated. In some embodiments, the di-phones can include vocal stress information (primary, secondary, reduced), information about a type of word (e.g., identify function words such as "a", "the", "to", "you"), vowel/consonant information, and/or articulation information (e.g., is the phone sonorant or obstructive, nasal, approximant, vowel or lateral). The collection of di-phones can be termed as a "linguistic feature specification" for the input text.

A spoken voice to be used for synthesis can be broken down into di-phones as well and stored in a database. Each di-phone can be represented by zero or more models, or example di-phone from spoken text. Each model has one or more units, or examples of spoken text for the model's di-phone. For example, if the spoken voice only uttered the words "My dad took a strength test", only the di-phones in this utterance would have models, and each di-phone would have one unit. As another example utterance, "The dog ran a long, long, long way before reaching Irana's home", there may be multiple units for the di-phones representing "ong-l" (between utterances of the word "long") and the di-phones represent "an-a" (between utterances of the words "ran a" and the second and third syllables of "Irana's").

A model chain is a collection of models that correspond to di-phones of an input linguistic feature specification. In some cases, a model may not be available as the desired speech may not have been captured. For example, no model would exist for the di-phones in phrase "portable xylophone" based on the utterances in the previous paragraph. Then, one or more substitute di-phones can be selected to form the model chain, with each substitute di-phone having a "substitution cost" representing an error in using the substitute di-phone. Additionally, a "join cost" or cost representing connecting two models to form a synthesized speech can be determined. As join costs can vary from unit to unit, a number of units per di-phone can be limited to minimize calculation costs/time for determining join costs between di-phones. For example, one di-phone may be represented by at most 500 units, or some another pre-determined positive number of units.

Figure 5B:
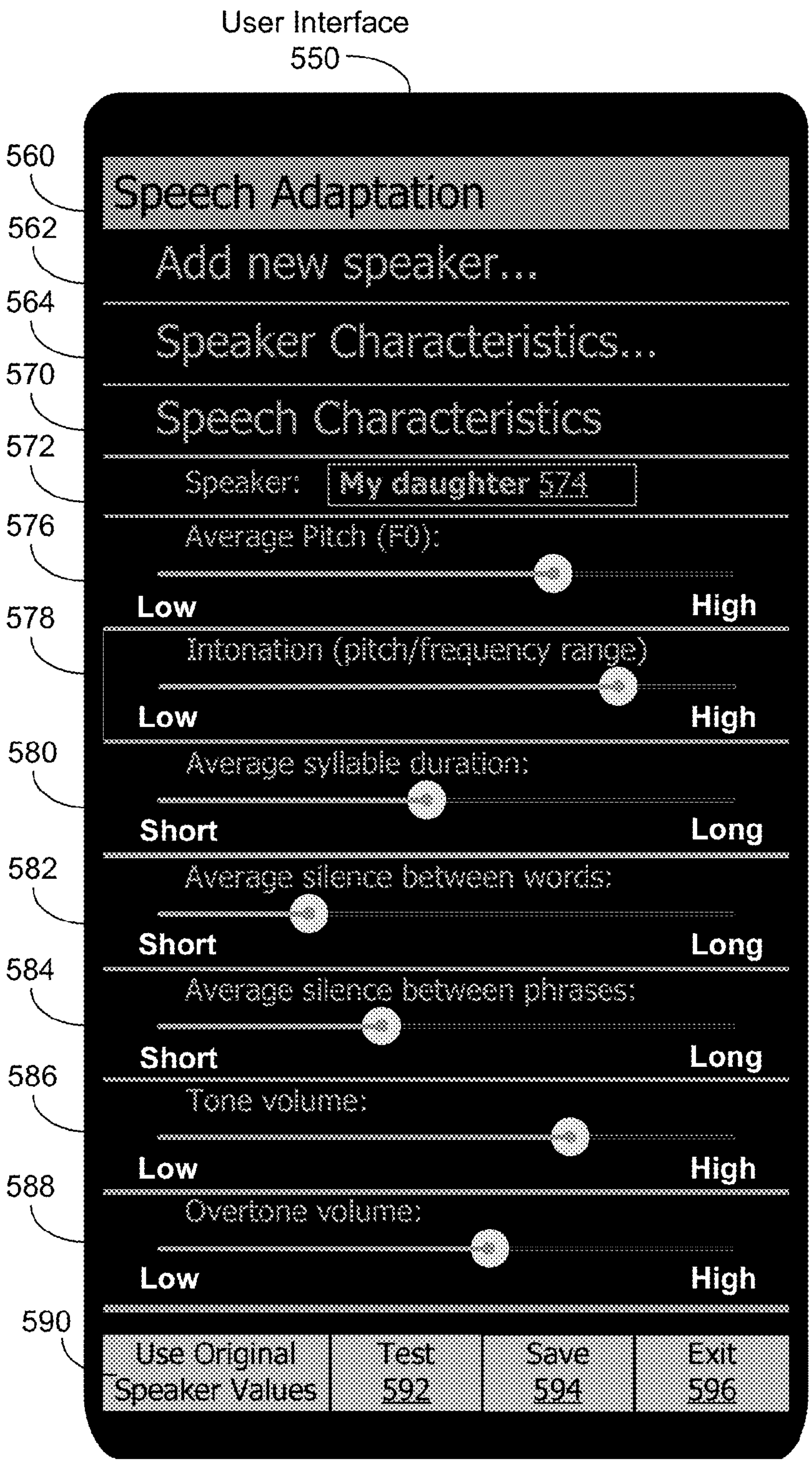
FIG. 5B shows an example user interface, in accordance with an example embodiment.

FIG. 5B shows example user interface 550, in accordance with an example embodiment. In some embodiments, speech parameters, such as parameters related to fundamental frequencies, prosody, and duration, can be stored with nodes of the completed speech model. In particular of these embodiments, a user interface can be provided to review, update, delete, and/or insert speech characteristics for a completed speech model.

FIG. 5B shows user interface 550 for speech adaptation including user interface functionality for adding a new speaker 562, reviewing, updating, deleting, and/or inserting speaker characteristics 564, and reviewing and/or updating speech characteristics 570. FIG. 5B specifically shows speech characteristics 570 for a speaker 572 named "My daughter." By selecting button 574, a user interface for reviewing, updating, deleting, and/or inserting speaker characteristics not shown in the Figures can be displayed. In some embodiments, the user interface for speaker characteristics can be used to review, delete, and/or add speech used to generate an adapted acoustic model; i.e., review, delete, and/or add speech data 110 as shown in FIG. 3.

Beyond a speaker's name and associated speaker characteristics, speech characteristics 570 can include average pitch (F0) 576, intonation 578, average syllable duration 580, average silence between words 582, average silence between phrases 584, tone volume 586, and overtone volume 588. Each of characteristics 576, 578, 580, 582, 584, 586, and 588 can be individually modified using a slider bar for the characteristic, as shown in FIG. 5B. In other embodiments, more, fewer, and/or different speech characteristics can be reviewed and/or updated via than the speech characteristics shown 576, 578, 580, 582, 584, 586, and 588 in FIG. 5B.

Buttons 590, 592, 594, and 596, respectively, can be used to: use the original speaker values, test current speech characteristics on an excerpt of text such as "This an example utterance", save (updated) speech characteristics 576-588, or exit user interface 550 without saving changes to speech characteristics 576-588. When button 590 is selected, values of speech characteristics 576-588 can restore values of speech characteristics 576-588 to values determined just after completion of an acoustic model; e.g., revert to values of speech characteristics 576-588 as determined just after an acoustic model is completed, such as shown in FIG. 4.

Example Data Network

Figure 6:
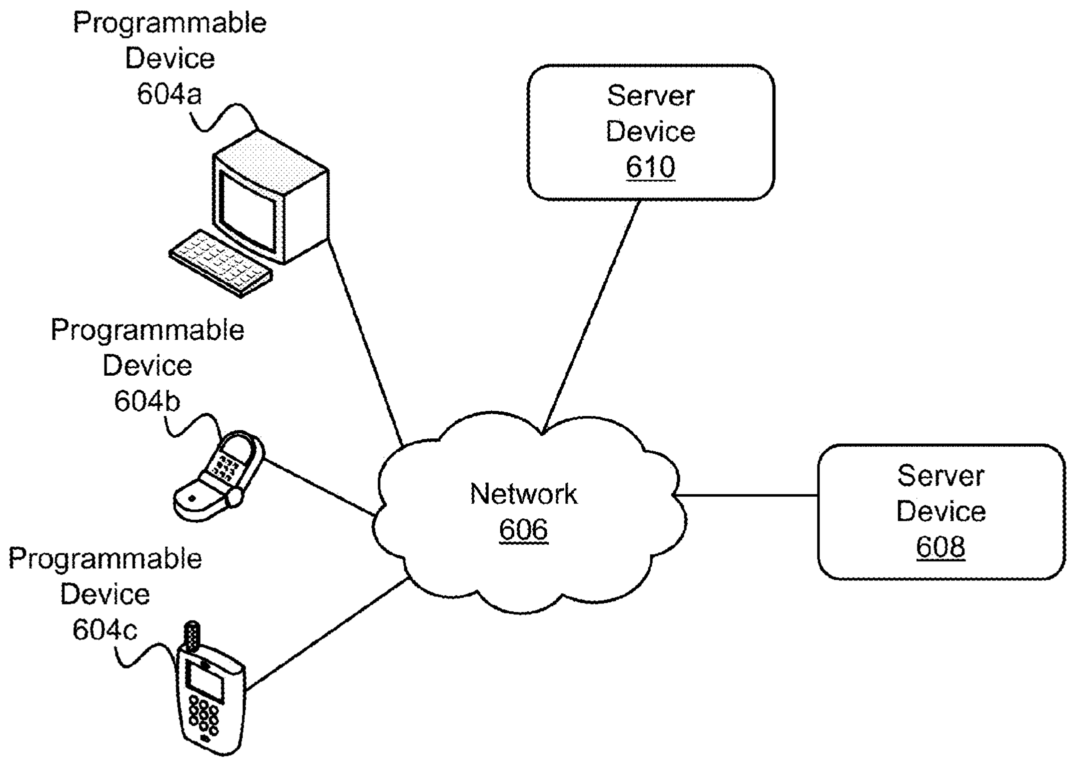
FIG. 6 depicts a distributed computing architecture, in accordance with an example embodiment.

FIG. 6 shows server devices 608, 610 configured to communicate, via network 606, with programmable devices 604*a*, 604*b*, and 604*c*. Network 606 may correspond to a LAN, a wide area network (WAN), a corporate intranet, the public Internet, or any other type of network configured to provide a communications path between networked computing devices. The network 606 may also correspond to a combination of one or more LANs, WANs, corporate intranets, and/or the public Internet.

Although FIG. 6 only shows three programmable devices, distributed application architectures may serve tens, hundreds, or thousands of programmable devices. Moreover, programmable devices 604*a*, 604*b*, and 604*c* (or any additional programmable devices) may be any sort of computing device, such as an ordinary laptop computer, desktop computer, network terminal, wireless communication device (e.g., a cell phone or smart phone), and so on. In some embodiments, programmable devices 604*a*, 604*b*, and 604*c* may be dedicated to the design and use of software applications. In other embodiments, programmable devices 604*a*, 604*b*, and 604*c* may be general purpose computers that are configured to perform a number of tasks and need not be dedicated to software development tools.

Server devices 608, 610 can be configured to perform one or more services, as requested by programmable devices 604*a*, 604*b*, and/or 604*c*. For example, server device 608 and/or 610 can provide content to programmable devices 604*a*-604*c*. The content can include, but is not limited to, web pages, hypertext, scripts, binary data such as compiled software, images, audio, and/or video.

The content can include compressed and/or uncompressed content. The content can be encrypted and/or unencrypted. Other types of content are possible as well.

As another example, server device 608 and/or 610 can provide programmable devices 604*a*-604*c* with access to software for database, search, computation, graphical, audio, video, World Wide Web/Internet utilization, and/or other functions. Many other examples of server devices are possible as well.

Computing Device Architecture

Figure 7A:
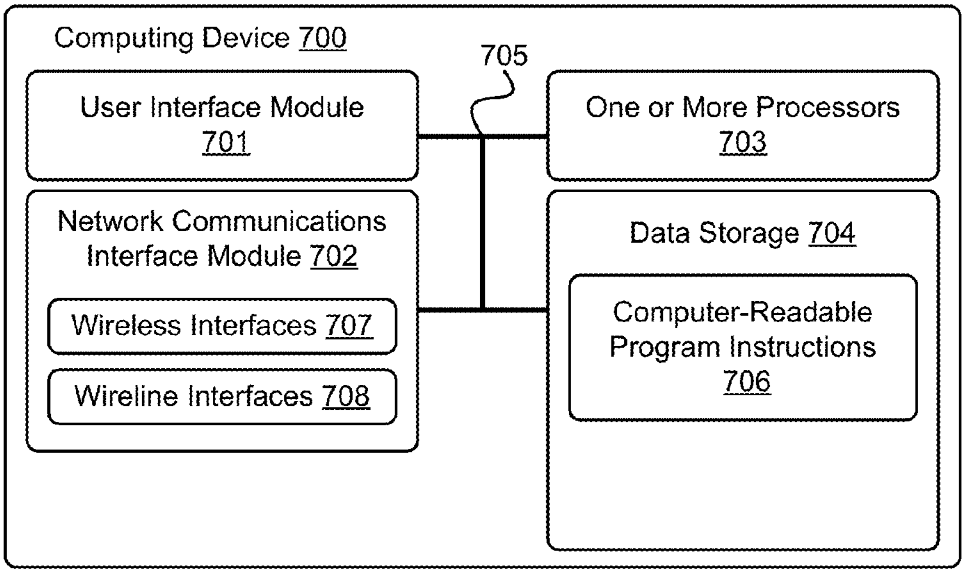
FIG. 7A is a block diagram of a computing device, in accordance with an example embodiment.

FIG. 7A is a block diagram of a computing device (e.g., system) in accordance with an example embodiment. In particular, computing device 700 shown in FIG. 7A can be configured to perform one or more functions of server devices 608, 610, network 606, and/or one or more of programmable devices 604*a*, 604*b*, and 604*c*. Computing device 700 may include a user interface module 701, a network-communication interface module 702, one or more processors 703, and data storage 704, all of which may be linked together via a system bus, network, or other connection mechanism 705.

User interface module 701 can be operable to send data to and/or receive data from external user input/output devices. For example, user interface module 701 can be configured to send and/or receive data to and/or from user input devices such as a keyboard, a keypad, a touch screen, a computer mouse, a track ball, a joystick, a camera, a voice recognition module, and/or other similar devices. User interface module 701 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 701 can also be configured to generate audible output(s), such as a speaker, speaker jack, audio output port, audio output device, earphones, and/or other similar devices.

Network-communications interface module 702 can include one or more wireless interfaces 707 and/or one or more wireline interfaces 708 that are configurable to communicate via a network, such as network 606 shown in FIG. 6. Wireless interfaces 707 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 708 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 702 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 703 can include one or more general purpose processors and/or one or more special purpose processors (e.g., digital signal processors, application specific integrated circuits, etc.). Processors 703 can be configured to execute computer-readable program instructions 706*a* that are contained in the data storage 704 and/or other instructions as described herein.

Data storage 704 can include one or more computer-readable storage media that can be read and/or accessed by at least one of processors 703. The one or more computer-readable storage media can include volatile and/or non-volatile storage components, such as optical, magnetic, organic or other memory or disc storage, which can be integrated in whole or in part with at least one of processors 703. In some embodiments, data storage 704 can be implemented using a single physical device (e.g., one optical, magnetic, organic or other memory or disc storage unit), while in other embodiments, data storage 704 can be implemented using two or more physical devices.

Data storage 704 can include computer-readable program instructions 706 and perhaps additional data, such as but not limited to data used by one or more processes and/or threads of a software application. In some embodiments, data storage 704 can additionally include storage required to perform at least part of the herein-described methods and techniques and/or at least part of the functionality of the herein-described devices and networks.

Cloud-Based Servers

Figure 7B:
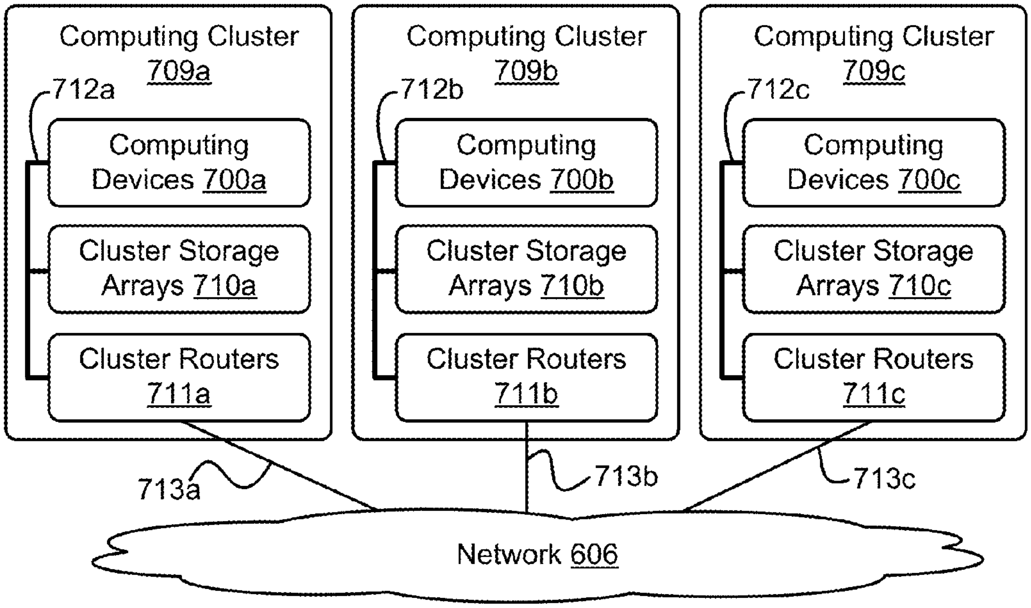
FIG. 7B depicts a cloud-based server system, in accordance with an example embodiment.

FIG. 7B depicts a network 606 of computing clusters 709*a*, 709*b*, 709*c* arranged as a cloud-based server system in accordance with an example embodiment. Server devices 608 and/or 610 can be cloud-based devices that store program logic and/or data of cloud-based applications and/or services. In some embodiments, server devices 608 and/or 610 can be a single computing device residing in a single computing center. In other embodiments, server device 608 and/or 610 can include multiple computing devices in a single computing center, or even multiple computing devices located in multiple computing centers located in diverse geographic locations. For example, FIG. 6 depicts each of server devices 608 and 610 residing in different physical locations.

In some embodiments, data and services at server devices 608 and/or 610 can be encoded as computer readable information stored in non-transitory, tangible computer readable media (or computer readable storage media) and accessible by programmable devices 604*a*, 604*b*, and 604*c*, and/or other computing devices. In some embodiments, data at server device 608 and/or 610 can be stored on a single disk drive or other tangible storage media, or can be implemented on multiple disk drives or other tangible storage media located at one or more diverse geographic locations.

FIG. 7B depicts a cloud-based server system in accordance with an example embodiment. In FIG. 7B, the functions of server device 608 and/or 610 can be distributed among three computing clusters 709*a*, 709*b*, and 708*c*. Computing cluster 709*a* can include one or more computing devices 700*a*, cluster storage arrays 710*a*, and cluster routers 711*a* connected by a local cluster network 712*a*. Similarly, computing cluster 709*b* can include one or more computing devices 700*b*, cluster storage arrays 710*b*, and cluster routers 711*b* connected by a local cluster network 712*b*. Likewise, computing cluster 709*c* can include one or more computing devices 700*c*, cluster storage arrays 710*c*, and cluster routers 711*c* connected by a local cluster network 712*c*.

In some embodiments, each of the computing clusters 709*a*, 709*b*, and 709*c* can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 709*a*, for example, computing devices 700*a* can be configured to perform various computing tasks of server 608. In one embodiment, the various functionalities of server 608 can be distributed among one or more of computing devices 700*a*, 700*b*, and 700*c*. Computing devices 700*b* and 700*c* in computing clusters 709*b* and 709*c* can be configured similarly to computing devices 700*a* in computing cluster 709*a*. On the other hand, in some embodiments, computing devices 700*a*, 700*b*, and 700*c* can be configured to perform different functions.

In some embodiments, computing tasks and stored data associated with server devices 608 and/or 610 can be distributed across computing devices 700*a*, 700*b*, and 700*c* based at least in part on the processing requirements of server devices 608 and/or 610, the processing capabilities of computing devices 700*a*, 700*b*, and 700*c*, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 710*a*, 710*b*, and 710*c* of the computing clusters 709*a*, 709*b*, and 709*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 608 and/or 610 can be distributed across computing devices 700*a*, 700*b*, and 700*c* of computing clusters 709*a*, 709*b*, and 709*c*, various active portions and/or backup portions of these components can be distributed across cluster storage arrays 710*a*, 710*b*, and 710*c*. For example, some cluster storage arrays can be configured to store the data of server device 608, while other cluster storage arrays can store data of server device 610. Additionally, some cluster storage arrays can be configured to store backup versions of data stored in other cluster storage arrays.

The cluster routers 711*a*, 711*b*, and 711*c* in computing clusters 709*a*, 709*b*, and 709*c* can include networking equipment configured to provide internal and external communications for the computing clusters. For example, the cluster routers 711*a* in computing cluster 709*a* can include one or more internet switching and routing devices configured to provide (i) local area network communications between the computing devices 700*a* and the cluster storage arrays 701*a* via the local cluster network 712*a*, and (ii) wide area network communications between the computing cluster 709*a* and the computing clusters 709*b* and 709*c* via the wide area network connection 713*a* to network 606. Cluster routers 711*b* and 711*c* can include network equipment similar to the cluster routers 711*a*, and cluster routers 711*b* and 711*c* can perform similar networking functions for computing clusters 709*b* and 709*b* that cluster routers 711*a* perform for computing cluster 709*a*.

In some embodiments, the configuration of the cluster routers 711*a*, 711*b*, and 711*c* can be based at least in part on the data communication requirements of the computing devices and cluster storage arrays, the data communications capabilities of the network equipment in the cluster routers 711*a*, 711*b*, and 711*c*, the latency and throughput of local networks 712*a*, 712*b*, 712*c*, the latency, throughput, and cost of wide area network links 713*a*, 713*b*, and 713*c*, and/or other factors that can contribute to the cost, speed, fault-tolerance, resiliency, efficiency and/or other design goals of the moderation system architecture.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:

receiving, by a computing device, speech data corresponding to one or more spoken utterances of a particular speaker;

recognizing textual elements of a first input text corresponding to the speech data;

determining confidence levels associated with the recognized textual elements;

adapting speech-synthesis parameters of one or more decision trees based on the speech data, recognized textual elements, and associated confidence levels, wherein each adapted decision tree is configured to map individual elements of a text to individual of the speech-synthesis parameters, and wherein adapting the speech-synthesis parameters of one or more decision trees comprises:

selecting a top node of the one or more decision trees, wherein the top node comprises one or more sub-nodes, wherein each of the one or more sub-nodes is associated with a selected textual element of the first input text;

determining a probability threshold;

for each of the one or more sub-nodes:

determining a probability that the selected textual element has the feature associated with the sub-node, the probability based on the associated confidence levels, determining whether the probability that the selected textual element has the associated feature exceeds the probability threshold, and in response to determining that the probability of the selected textual element having the associated feature exceeds the probability threshold, selecting the sub-node;

determining whether a sub-node of the one or more sub-nodes has been selected; and in response to determining that a selected sub-node of the one or more sub-nodes has been selected:

determining that the first input text has the associated feature, and selecting the selected sub-node as the top node;

receiving a second input text;

mapping the second input text to a set of speech-synthesis parameters using the one or more adapted decision trees; and generating a synthesized spoken utterance corresponding to the second input text using the set of speech-synthesis parameters, wherein at least some of the speech-synthesis parameters in the set of speech-synthesis parameters are configured to simulate the particular speaker.

2. The method of claim 1, wherein adapting the one or more decision trees comprises:

generating the one or more decision trees based on utilizing speech in a database of spoken speech.

3. The method of claim 1, wherein selecting the top node of the one or more decision trees comprises selecting a root node of the one or more decision trees as the top node.

4. The method of claim 1, wherein the associated confidence levels comprise:

a confidence level for a phoneme identity;

a confidence level for a phonetic class identity;

a confidence level for a word identity;

a confidence level for a location of an element within a syllable;

a confidence level for a location of an element within a word; and a confidence level for a location of an element within a sentence.

5. The method of claim 1, wherein each confidence level of the associated confidence levels comprises a posterior probability.

6. The method of claim 1, wherein the one or more decision trees comprise a decision tree for fundamental frequency, a spectral decision tree, a decision tree for duration, and a decision tree for aperiodicity.

7. A computing device, comprising:

a processor; and computer-readable memory having one or more instructions that, in response to execution by the processor, cause the computing device to perform functions comprising:

receiving speech data corresponding to one or more spoken utterances of a particular speaker, recognizing textual elements of a first input text corresponding to the speech data, determining confidence levels associated with the recognized textual elements, adapting speech-synthesis parameters of one or more decision trees based on the speech data, recognized textual elements, and associated confidence levels, wherein each adapted decision tree is configured to map individual elements of a text to individual of the speech-synthesis parameters, wherein adapting the speech-synthesis parameters of the one or more decision trees comprises:

selecting a top node of the one or more decision trees, wherein the top node comprises one or more sub-nodes, wherein each of the one or more sub-nodes is associated with a selected textual element of the first input text;

determining a probability threshold;

for each of the one or more sub-nodes:

determining a probability that the selected textual element has the feature associated with the sub-node, the probability based on the associated confidence levels, determining whether the probability that the selected textual element has the associated feature exceeds the probability threshold, and in response to determining that the probability of the selected textual element having the associated feature exceeds the probability threshold, selecting the sub-node;

determining whether a sub-node of the one or more sub-nodes has been selected; and in response to determining that a selected sub-node of the one or more sub-nodes has been selected:

determining that the first input text has the associated feature, and selecting the selected sub-node as the top node;

receiving a second input text, mapping the second input text to a set of speech-synthesis parameters using the one or more adapted decision trees, and generating a synthesized spoken utterance corresponding to the second input text using the set of speech-synthesis parameters, wherein at least some of the speech-synthesis parameters in the set of speech-synthesis parameters are configured to simulate the particular speaker.

8. The computing device of claim 7, wherein the function of adapting the one or more decision trees comprises:

generating the one or more decision trees based on utilizing speech in a database of spoken speech.

9. The computing device of claim 7, wherein selecting the top node of the one or more decision trees comprises selecting a root node of the one or more decision trees as the top node.

10. The computing device of claim 7, wherein the associated confidence levels comprise:

a confidence level for a phoneme identity;

a confidence level for a phonetic class identity;

a confidence level for a word identity;

a confidence level for a location of an element within a syllable;

a confidence level for a location of an element within a word; and a confidence level for a location of an element within a sentence.

11. The computing device of claim 7, wherein each confidence level of the associated confidence levels comprises a posterior probability.

12. The computing device of claim 7, wherein the one or more decision trees comprise a decision tree for fundamental frequency, a spectral decision tree, a decision tree for duration, and a decision tree for aperiodicity.

13. An article of manufacture including a computer-readable storage medium having instructions stored thereon that, when executed by a processor, cause the processor to perform functions comprising:

receiving speech data corresponding to one or more spoken utterances of a particular speaker;

recognizing textual elements of a first input text corresponding to the speech data;

determining confidence levels associated with the recognized textual elements;

adapting speech-synthesis parameters of one or more decision trees based on the speech data, recognized textual elements, and associated confidence levels, wherein each adapted decision tree is configured to map individual elements of a text to individual of the speech-synthesis parameters, and wherein the function of adapting the speech-synthesis parameters of the one or more decision trees comprises:

selecting a top node of the one or more decision trees, wherein the top node comprises one or more sub-nodes, wherein each of the one or more sub-nodes is associated with a selected textual element of the first input text;

determining a probability threshold;

for each of the one or more sub-nodes:

determining a probability that the selected textual element has the feature associated with the sub-node, the probability based on the associated confidence levels determining whether the probability that the selected textual element has the associated feature exceeds the probability threshold, and in response to determining that the probability of the selected textual element having the associated feature exceeds the probability threshold, selecting the sub-node;

determining whether a sub-node of the one or more sub-nodes has been selected; and in response to determining that a selected sub-node of the one or more sub-nodes has been selected:

determining that the first input text has the associated feature, and selecting the selected sub-node as the top node;

receiving a second input text;

mapping the second input text to a set of speech-synthesis parameters using the one or more adapted decision trees; and generating a synthesized spoken utterance corresponding to the second input text using the set of speech-synthesis parameters, wherein at least some of the speech-synthesis parameters in the set of speech-synthesis parameters are configured to simulate the particular speaker.

14. The article of manufacture of claim 13, wherein the function of adapting the one or more decision trees comprises:

generating the one or more decision trees based on utilizing speech in a database of spoken speech.

15. The article of manufacture of claim 13, wherein selecting the top node of the one or more decision trees comprises selecting a root node of the one or more decision trees as the top node.

16. The article of manufacture of claim 13, wherein the associated confidence levels comprise:

a confidence level for a phoneme identity;

a confidence level for a phonetic class identity;

a confidence level for a word identity;

a confidence level for a location of an element within a syllable;

a confidence level for a location of an element within a word; and a confidence level for a location of an element within a sentence.

17. The article of manufacture of claim 13, wherein the one or more decision trees comprise a decision tree for fundamental frequency, a spectral decision tree, a decision tree for duration, and a decision tree for aperiodicity.

* * * * *